(12) United States Patent
Den Doelder et al.

(10) Patent No.: US 9,963,524 B2
(45) Date of Patent: *May 8, 2018

(54) TUBULAR LOW DENSITY ETHYLENE-BASED POLYMERS WITH IMPROVED BALANCE OF EXTRACTABLES AND MELT ELASTICITY

(71) Applicant: Dow Global Technologies LLC, Midland, MI (US)

(72) Inventors: Cornelis F. J. Den Doelder, Terneuzen (NL); Otto J. Berbee, Hulst (NL); Stefan Hinrichs, Wondelgem (BE); Teresa P. Karjala, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/692,106

(22) Filed: Aug. 31, 2017

(65) Prior Publication Data

US 2017/0362356 A1 Dec. 21, 2017

Related U.S. Application Data

(63) Continuation of application No. 15/101,687, filed as application No. PCT/US2014/066607 on Nov. 20, 2014, now Pat. No. 9,765,160.

(60) Provisional application No. 61/918,275, filed on Dec. 19, 2013.

(51) Int. Cl.
   C08F 110/02 (2006.01)

(52) U.S. Cl.
   CPC .................................. *C08F 110/02* (2013.01)

(58) Field of Classification Search
   CPC ........................................................ C08F 210/16
   See application file for complete search history.

(56) References Cited

U.S. PATENT DOCUMENTS

| | | | |
|---|---|---|---|
| 6,844,408 B2 | 1/2005 | Gonioukh et al. | |
| 9,120,880 B2 | 9/2015 | Zschoch | |
| 9,228,036 B2 * | 1/2016 | Berbee | C09D 123/06 |
| 9,334,348 B2 * | 5/2016 | Berbee | C08F 210/16 |
| 2004/0214971 A1 | 10/2004 | Gonioukh et al. | |
| 2015/0274856 A1 * | 10/2015 | Berbee | C08F 110/02 |
| | | | 521/143 |

FOREIGN PATENT DOCUMENTS

| | | |
|---|---|---|
| WO | 01/68723 A2 | 9/2001 |
| WO | 02/14379 A1 | 2/2002 |
| WO | 2013/078018 A2 | 5/2013 |
| WO | 2013/078224 A1 | 5/2013 |
| WO | 2013/083285 A1 | 6/2013 |
| WO | 2013/178241 A1 | 12/2013 |
| WO | 2013/178242 A1 | 12/2013 |

* cited by examiner

*Primary Examiner* — Rip A Lee
(74) *Attorney, Agent, or Firm* — Husch Blackwell LLP (57) ABSTRACT

The invention provides an ethylene-based polymer comprising the following properties:
a) weight fraction (w) of molecular weight above $5*10^6$ g/mol, w>A−B*I2, where A=0.4 wt %, and B is 0.02 wt %/(dg/min), and w<C−B*I$_2$%, where C=0.9 wt %; and
b) G'>D−E*log(I2), where D=162 Pa and E=52 Pa/log(dg/min).

20 Claims, 3 Drawing Sheets

TUBULAR LOW DENSITY ETHYLENE-BASED POLYMERS WITH IMPROVED BALANCE OF EXTRACTABLES AND MELT ELASTICITY

CROSS REFERENCE TO RELATED APPLICATIONS

This application is a continuation of application Ser. No. 15/101,687, now U.S. Pat. No. 9,765,160 filed on Jun. 3, 2016, which is a national stage entry of PCT/US2014/066607, filed on Nov. 20, 2014 and claims priority from Provisional Application No. 61/918,275, filed on Dec. 19, 2013.

BACKGROUND OF THE INVENTION

Resins for extrusion coating on paper, board, aluminum, etc., are designed with broad molecular weight distribution (MWD) and low extractables. In extrusion coating application the polymer is processed at high temperature conditions, typically 280° C. to 350° C. Broad MWD (which typically requires a significant high molecular weight fraction) is necessary for good processability during coating (neck-in and draw down balance), while low extractables are needed for low smoke formation during coating, at high temperature conditions, and/or for food contact compliance.

Broad MWD low density polyethylene (LDPE) is made up of low and high molecular weight polymer molecules, and an average molecular weight will determine the melt index. The extractable fraction increases with an increasing fraction of low molecular weight molecules, and is enhanced by increasing short chain branching frequency at low molecular weight molecules. In view of this combination of features, there is typically a trade-off between coating performance and extractable level.

Typically LDPE resins with broad MWD are made in an autoclave reactor or a combination of autoclave and tube reactors. Broad MWD resins can be achieved in autoclave reactor systems by promoting long chain branching and through the inherent residence time distribution by which molecules will undergo shorter (low molecular weight) or longer (high molecular weight) growth paths.

WO 2013/083285 teaches, among other things, a LDPE having an Mw/Mn which is greater than 15, a storage modulus G' (5 kPa) which is above 3000, and a vinylidene content which is at least 15/100k C, compositions and a process for producing the LDPE in a tubular reactor by radical initiated polymerization where the polymerization is performed by reacting the ethylene monomer under the action of one or more radical initiators, e.g., peroxides, wherein the amount of used radical initiator is at least three times the conventionally used amount. The storage modulus G' at loss modulus G"=5 kPa is shown to be generally higher for the inventive LDPE than the standard tubular LDPE produced with conventional techniques.

WO 2013/078018 A2 and WO 2013/078224 teach that tubular reactor products, which are suitable for extrusion coating application by having broad MWD, low extractables and high enough melt strength and rheological G', can be made without any chemical modification, for instance without the use of cross-linking agents in reactors, separators, extruders, etc.

The intrinsic drawback of a more uniform residence time distribution in the tubular versus the autoclave process, which negatively limits the broadness of the MWD, is compensated by a careful selection of process conditions, like reactor configuration, peak temperature, reactor inlet pressure, conversion level, fresh ethylene and/or CTA distribution, etc.

For the resins described in the above patents it has been found that at a given melt index (I2), the melt strength and rheological G' can be increased at the cost of extractable level by synthesis of products at higher absolute (abs) Mw and broader MWD by adapting the process conditions.

Schmidt et al (Macromolecular Materials and Engineering, Vol 290, p 4004-414, 2005) describe and model the impact of segmented flow distribution in a tubular reactor and its effect on formation of an ultra-high molecular weight tail in MWD. Flow segmentation will always be present to some extent by the laminar boundary layers at the wall, even when a highly turbulent flow regime is maintained. Flow segmentation in a tubular reactor can be enhanced by dynamic and or static fouling. The conditions required for making tubular extrusion coating resins lead to branched, high molecular weight polymer susceptible to fouling and or chain entanglement with polymer already adhered at the inside tubular wall. The polymers cited in WO 2013/078018 A2 and WO 2013/078224 have been made at minimum flow segmentation conditions as demonstrated by the low level of the ultra-high molecular weight tail in the light scattering gel permeation chromatography (LS GPC) curve. However it has been found that depending on the train configuration and/or operation condition this ultra-high molecular weight tail can be significantly increased as shown by LS absolute GPC data. The presence of this ultra-high molecular weight tail will significantly increase Mw(abs) and broaden the MWD. However surprisingly it has been found that this increase in Mw(abs) has minor impact on the MS and G' performance of the produced material, leading to a higher Mw(abs) and broader MWD design for the same MS and G' performance. This broader MWD design at a fixed melt index implies more ultra-high molecular weight as well as more low molecular weight. This typically leads to a higher extractable level.

Thus, there is a need for new ethylene-based polymers with low extractables even when the MWD is broadened as in the case of enhanced flow segmentation in a tubular process (as analyzed by LS GPC). These new polymers are suitable for extrusion coating applications, and can be made in a tubular process showing an increased tendency to flow segmentation. There is a further need for such polymers that can be prepared without any chemical modification, for instance without the use of cross-linking agents in reactors, separators, extruders, etc., or the use of blending operations.

SUMMARY OF THE INVENTION

The invention provides an ethylene-based polymer comprising the following properties:
a) weight fraction (w) of molecular weight above $5*10^6$ g/mol, w>A−B*$I_2$, where A=0.4 wt %, and B is 0.02 wt %/(dg/min), and w<C−B*$I_2$%, where C=0.9 wt %; and
b) G'>D−E*log($I_2$), where D=162 Pa and E=52 Pa/log (dg/min).

DETAILED DESCRIPTION OF THE PREFERRED EMBODIMENT

As discussed above, the invention provides an ethylene-based polymer comprising the following properties:
 a) weight fraction (w) of molecular weight above $5*10^6$ g/mol, w>A−B*$I_2$, where A=0.4 wt %, and B is 0.02 wt %/(dg/min), and w<C−B*$I_2$%, where C=0.9 wt %; and
 b) G'>D−E*log($I_2$), where D=162 Pa and E=52 Pa/log (dg/min).

The ethylene-based polymer may comprise a combination of two or more embodiments as described herein.

In one embodiment, the ethylene-based polymer has a melt index ($I_2$) from 0.4 to 16 dg/min, or from 0.5 to 16 dg/min.

In one embodiment, the ethylene-based polymer is selected from a polyethylene homopolymer or an ethylene-based interpolymer.

In one embodiment, in the ethylene-based polymer is selected from a polyethylene homopolymer or an ethylene-based copolymer; and wherein the comonomer of the ethylene-based copolymer is selected from vinyl acetate, an alkyl acrylate, carbon monoxide (CO), acrylic acid, a carboxylic acid-containing comonomer, or a mono-olefin. In a further embodiment, the comonomer is present in an amount from 0.5 to 10 wt % comonomer, based on weight of copolymer.

In one embodiment, the ethylene-based polymer comprises less than 30 mole parts per million (ppm) of a crosslinking agent (able to form a covalent bond or linkage between two polymer molecules) or a comonomer with crosslinking capability (able to form a covalent bond or linkage between two polymer molecules), based on total moles of monomer units in the ethylene-based polymer. In a further embodiment, the ethylene-based polymer comprises less than 30 ppm of a comonomer containing multiple unsaturations or containing an acetylenic functionality.

It is understood that trace amounts of impurities can be incorporated into the polymer structure; for example, low traces acetylenic components (less than 20 mol ppm in polymer) can be present in the ethylene feed according to typical specifications for ethylene (for example, acetylene at a maximum 5 mol ppm in the ethylene supply).

Desirably, the inventive ethylene-based polymer has low gels. Thus, the direct addition of crosslinking agents or comonomers with crosslinking capability is not desired in the polymerizations of the inventive ethylene-based polymers described herein.

In one embodiment, the ethylene-based polymer has a n-hexane extractable level less than or equal to (≤) 4.0 wt %, or 3.5 wt %, or 3.0 wt %, or 2.6 wt %, or 2.0 wt %.

In one embodiment, the ethylene-based polymer has an n-hexane extractable level vs melt index relationship: n-hexane extractables <A+B*log($I_2$), where A=3.00 wt % and B=1.66 wt %/log(dg/min).

In one embodiment, the ethylene-based polymer has an n-hexane extractable level vs melt index relationship: n-hexane extractables <A+B*log($I_2$), where A=2.30 wt % and B=1.66 wt %/log(dg/min). The hexane extractable is determined by the standard test method described herein.

In one embodiment, the n-hexane extractables of the ethylene-based polymer are <X wt %+Y*log($I_2$), where X=2.3 wt % and Y=1.66 wt %/log(dg/min).

In one embodiment, the n-hexane extractables of the ethylene-based polymer are <X wt %+Y*log($I_2$), where X=2.3 wt % and Y=1.66 wt %/log(dg/min) when the $I_2$ is as follows: 0.5 dg/min<$I_2$<12 dg/min, or 0.6 dg/min<$I_2$<12 dg/min, or 0.8 dg/min<$I_2$<12 dg/min.

In one embodiment, the ethylene-based polymer has a weight fraction (w) of molecular weight above $5*10^6$ g/mol, greater than 0.4 wt % and smaller than 0.7 wt %.

In one embodiment, the ethylene-based polymer is a polyethylene homopolymer.

In one embodiment, the ethylene-based polymer is an ethylene-based copolymer; and wherein the comonomer of the ethylene-based copolymer is selected from vinyl acetate, an alkyl acrylate, CO, acrylic acid, a carboxylic acid-containing comonomer, or a mono-olefin. In a further embodiment, the comonomer is selected from vinyl acetate, an alkyl acrylate, acrylic acid, or a mono-olefin.

In one embodiment, the ethylene-based polymer has an Mw(abs) versus melt index ($I_2$) relationship: Mw(abs)≤A+B*log($I_2$), where A=3.50*$10^5$ grams per mole (g/mole), and B=−1.20*$10^5$ (g/mole)/log(dg/min).

In one embodiment, the ethylene-based polymer has an Mw(abs)≤250,000 g/mole.

In one embodiment, the ethylene-based polymer has an Mw(abs)≥G+H*log($I_2$), where G=1.80*$10^5$ g/mole, or G=2.00*$10^5$ g/mole, and H=−1.20*$10^5$ (g/mole)/log(dg/min).

In one embodiment, the ethylene-based polymer has an Mw(abs)≥140,000 g/mole.

In one embodiment, the ethylene-based polymer has a Mw(abs)/Mn(abs) from 10.0 to 30.0, or from 15.0 to 25.0, or from 17.0 to 24.0.

In one embodiment, the ethylene-based polymer has a G' versus $I_2$ relationship: G'>D−E*log($I_2$), where D=167 Pa and E=52 Pa/log(dg/min).

In one embodiment, the ethylene-based polymer has an $I_2$≥0.5 dg/min, or ≥0.8 dg/min, or ≤20 dg/min, or ≤16 dg/min, or ≤12 dg/min, or ≤10 dg/min. In one embodiment, the ethylene-based polymer has a density from 0.910 to 0.940 g/cc (1 cc=1 $cm^3$).

In one embodiment, the ethylene-based polymer has a density greater than, or equal to, 0.9160 g/cc, or greater than, or equal to, 0.9180 g/cc.

In one embodiment, the ethylene-based polymer has a density less than, or equal to, 0.9250 g/cc, or less than, or equal to, 0.920 g/cc.

In one embodiment, the ethylene-based polymer is prepared in a reactor configuration comprising at least one tubular reactor.

In one embodiment, the ethylene-based polymer is prepared in a reactor configuration comprising at least one tubular reactor with at least three reactor zones.

In one embodiment, the ethylene-based polymer is prepared in a reactor configuration comprising at least one tubular reactor with at least four reactor zones.

An inventive ethylene-based polymer may comprise a combination of two or more embodiments as described herein.

The invention also provides a composition comprising an inventive ethylene-based polymer, as described herein.

In one embodiment, the composition further comprises another ethylene-based polymer. In one embodiment the other ethylene-based polymer is a polyethylene homopolymer or LDPE.

An inventive composition may comprise a combination of two or more embodiments as described herein.

The invention also provides an article comprising at least one component formed from an inventive composition.

In one embodiment, the article is an extrusion coating. In another embodiment, the article is a film.

An inventive article may comprise a combination of two or more embodiments as described herein.

Polymerizations

For a high pressure, free radical initiated polymerization process, two basic types of reactors are known. The first type is an agitated autoclave vessel having one or more reaction zones (the autoclave reactor). The second type is a jacketed tube which has one or more reaction zones (the tubular reactor).

The pressure in each autoclave and tubular reactor zone of the process is typically from 100 to 400 megapascals (MPa), more typically from 120 to 360 MPa, and even more typically from 150 to 320 MPa.

The polymerization temperature in each tubular reactor zone of the process is typically from 100 to 400° C., more typically from 130 to 360° C., and even more typically from 140 to 340° C.

The polymerization temperature in each autoclave reactor zone of the process is typically from 150 to 300° C., more typically from 160 to 290° C., and even more typically from 170 to 280° C. One skilled in the art understands that the temperatures in the autoclave are considerably lower and less differentiated than those of the tubular reactor, and thus, more favorable extractable levels are typically observed in polymers produced in an autoclave-based reactor systems.

The high pressure process of the present invention to produce polyethylene homo- or interpolymers having the advantageous properties as found in accordance with the invention, is preferably carried out in a tubular reactor having at least three reaction zones.

Initiators

The process of the present invention is a free radical polymerization process. The type of free radical initiator to be used in the present process is not critical, but preferably one of the initiators applied should allow high temperature operation in the range from 300° C. to 350° C. Free radical initiators that are generally used include organic peroxides, such as peresters, perketals, peroxy ketones, percarbonates and cyclic multifunctional peroxides.

These organic peroxy initiators are used in conventional amounts, typically from 0.005 to 0.2 wt %, based on the weight of polymerizable monomers. Peroxides are typically injected as diluted solutions in a suitable solvent, for example, in a hydrocarbon solvent.

Other suitable initiators include azodicarboxylic esters, azodicarboxylic dinitriles and 1,1,2,2-tetramethylethane derivatives, and other components capable of forming free radicals in the desired operating temperature range.

In one embodiment, an initiator is added to at least one reaction zone of the polymerization, and wherein the initiator has a half-life temperature at one second greater than 255° C., preferably greater than 260° C. In a further embodiment, such initiators are used at a peak polymerization temperature from 320° C. to 350° C. In a further embodiment, the initiator comprises at least one peroxide group incorporated in a ring structure.

Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also WO 02/14379 and WO 01/68723.

Chain Transfer Agents (CTA)

Chain transfer agents or telogens are used to control the melt index (MI or $I_2$) in a polymerization process. Chain transfer involves the termination of growing polymer chains, thus limiting the ultimate molecular weight of the polymer material. Chain transfer agents are typically hydrogen atom donors that will react with a growing polymer chain, stop the polymerization reaction of the chain, and initiate the growth of a new polymer molecule. These agents can be of many different types and can include saturated hydrocarbons or unsaturated hydrocarbons, aldehydes, ketones and alcohols. By controlling the concentration of the selected chain transfer agent, one can control the length of polymer chains, and, hence the molecular weight, for example, the number average molecular weight, Mn. The melt index of a polymer, which is related to Mn, is controlled in the same way.

The chain transfer agents used in the process of this invention include, but are not limited to, aliphatic hydrocarbons, such as, for example, pentane, hexane, cyclohexane, propene, pentene or hexene; ketones such as acetone, diethyl ketone or diamyl ketone; aldehydes such as formaldehyde or acetaldehyde; and saturated aliphatic alcohols such as methanol, ethanol, propanol or butanol.

A further way to influence the melt-index includes the buildup and control, in the ethylene recycle streams, of incoming ethylene impurities, like methane and ethane, peroxide dissociation products, like tert-butanol, acetone, etc., and or solvent components used to dilute the initiators. These ethylene impurities, peroxide dissociation products and/or dilution solvent components can act as chain transfer agents.

The distribution of the chain transfer agent over and in the reaction zones is an important parameter to broaden molecular weight distribution (MWD) and to increase melt strength, while remaining all other process conditions constant. See International Publication No. WO2013/059042 for descriptions of how to use the fresh ethylene and/or CTA feed distribution to influence the chain transfer agent distribution over and in the reaction zones.

Polymers

In one embodiment, the ethylene-based polymers of this invention have a density from 0.914 to 0.940, more typically from 0.916 to 0.930 and even more typically from 0.918 to 0.926, grams per cubic centimeter (g/cc or g/cm$^3$). In one embodiment, the ethylene-based polymers of this invention have a melt index ($I_2$) from 0.3 to 16, or from 0.4 to 16, or from 0.5 to 16, or from 0.8 to 14, or from 0.8 to 12, grams per 10 minutes (g/10 min) at 190° C./2.16 kg.

Ethylene-based polymers include LDPE homopolymer, and high pressure copolymers, including ethylene/vinyl acetate (EVA), ethylene ethyl acrylate (EEA), ethylene butyl acrylate (EBA), ethylene acrylic acid (EAA), and ethylene carbon monoxide (ECO). Other suitable comonomers are described in Ehrlich, P.; Mortimer, G. A.; *Adv. Polymer Science; Fundamentals of Free-radical Polymerization of Ethylene*; Vol. 7, pp. 386-448 (1970). In one embodiment, comonomers exclude comonomers capable of crosslinking polymer chains, for instance containing multiple unsaturations or an acetylenic functionality.

Monomer and Comonomers

The term ethylene interpolymer as used in the present description, and the claims, refers to polymers of ethylene and one or more comonomers. Suitable comonomers to be used in the ethylene polymers of the present invention include, but are not limited to, ethylenically unsaturated monomers and especially $C_{3-20}$ alpha-olefins, carbon monoxide, vinyl acetate, and $C_{2-6}$ alkyl acrylates. In one embodiment, the ethylene-based polymer does not contain comonomers capable of crosslinking polymer chains, for instance comonomers containing multiple unsaturations or containing an acetylenic functionality.

Blends

The inventive polymers can be blended with one or more other polymers, such as, but not limited to, linear low density polyethylene (LLDPE); copolymers of ethylene with one or more alpha-olefins, such as, but not limited to, propylene, butene-1, pentene-1, 4-methyl-pentene-1, pentene-1, hexene-1 and octene-1; high density polyethylene (HDPE), such as HDPE grades HD 940-970 available from The Dow Chemical Company. The amount of inventive polymer in the blend can vary widely, but typically it is from 10 to 90, or from 15 to 85, or from 20 to 80, weight percent (wt %), based on the weight of the polymers in the blend. The LDPE (inventive)/LLDPE blends typically provide good optics and processing characteristics, and/or are useful in the preparation of laminations, and/or are useful in such applications as films, extrusion coatings, foams, and wire and cables.

In one embodiment the invention is a composition comprising a blend of an ethylene-based polymer of this invention and an ethylene-based polymer not of this invention, e.g., an LDPE that differs from the ethylene-based polymers of this invention in one or more properties such as n-hexane extractables, or (w) weight fraction of molecular weight above $5*10^6$ g/mol, $w > A - B*I2$, where $A=0.4$ wt %, and B is 0.02 wt %/(dg/min), and $w < C - B*I_2 \%$, where $C=0.9$ wt %, etc.

Additives

One or more additives may be added to a composition comprising an inventive polymer. Suitable additives include stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, and oil extenders, including paraffinic or naphthenic oils.

Applications

An inventive composition may be employed in a variety of conventional thermoplastic fabrication processes to produce useful articles, including extrusion coatings; films; and molded articles, such as blow molded, injection molded, or rotomolded articles; foams; wire and cable, fibers, and woven or non-woven fabrics.

Definitions

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene, based on the weight of the polymer and, optionally, may comprise at least one comonomer.

The term "ethylene-based interpolymer" or "ethylene interpolymer" refers to an interpolymer that comprises a majority amount of polymerized ethylene, based on the weight of the interpolymer, and comprises at least one comonomer.

The term "ethylene-based copolymer" or "ethylene copolymer" refers to an interpolymer that comprises a majority amount of polymerized ethylene, based on the weight of the copolymer, and only one comonomer (thus, only two monomer types).

The term "reaction zone" refers to a vessel, e.g., a reactor, or a section of a vessel, in which the polymerization reaction is initiated by addition of radicals or components which dissociate into, and/or generate radicals. Exemplary vessels or reactors include but are not limited to, autoclaves, tubular reactors, extruder reactors, etc. The reaction medium can be heated and/or cooled by a heat transfer medium flowing through the jacket around the reaction zone.

The term "first reaction zone," as used herein, refers to the reactor zone where the polymerization is first initiated by the addition of radicals or components which dissociate into, and/or generate, radicals. The first reaction zone ends at the point where there is a new feed of fresh and/or recycled ethylene and/or of radicals and/or components which dissociate into, and/or generate, radicals.

The terms "subsequent reaction zone," or "sequential reaction zone," as used herein, refer to a reactor zone which receives ethylene and polymer from a previous reactor zone, and where radicals or components, which dissociate into, and/or generate, radicals, are added at the inlet of the subsequent (or sequential) reactor zone. The subsequent (or sequential) reaction zone ends at the point where there is a new feed of fresh and/or recycled ethylene and/or of radicals and/or components which dissociate into, and/or generate, radicals; however, the nth reaction zone ends at the position of a pressure control device of the reactor system. The number of subsequent (or sequential) reaction zones is (n−1), where n is the total number of reaction zones. The second reaction zone is the subsequent or sequential reaction zone of the first reaction zone, and so forth.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density: Samples for density measurement are prepared according to ASTM D 1928. Polymer samples are pressed at 190° C. and 30,000 psi for three minutes, and then at 21° C. and 207 MPa for one minute. Measurements are made within one hour of sample pressing using ASTM D792, Method B.

Melt Index: Melt index, or $I_2$, (g/10 min or dg/min) is measured in accordance with ASTM D 1238, Condition 190° C./2.16 kg. $I_{10}$ is measured with ASTM D 1238, Condition 190° C./10 kg.

Light Scattering Gel Permeation Chromatography (LS-GPC):

Triple Detector Gel Permeation Chromatography (TD-GPC): High temperature TD-GPC analysis is performed on an ALLIANCE GPCV2000 instrument (Waters Corp.) set at 145° C. The flow rate for the GPC is 1 milliliter per minute (mL/min). The injection volume is 218.5 microliters (μL). The column set consists of four, Mixed-A columns (20-micron (μm) particles; 7.5×300 mm; Polymer Laboratories Ltd).

Detection is achieved by using an IR4 detector from PolymerChAR, equipped with a CH-sensor; a Wyatt Technology Dawn DSP Multi-Angle Light Scattering (MALS) detector (Wyatt Technology Corp., Santa Barbara, Calif., USA), equipped with a 30-megawatt (mW) argon-ion laser operating at λ=488 nm; and a Waters three-capillary viscosity detector. The MALS detector is calibrated by measuring the scattering intensity of the 1,2,4-trichlorobenzene (TCB) solvent. Normalization of the photodiodes is done by injecting SRM 1483, a high density polyethylene (HDPE) with weight-average molecular weight (Mw) of 32,100 and polydispersity (molecular weight distribution) of 1.11. A specific refractive index increment (dn/dc) of 0.104 mL/mg, for polyethylene in TCB, is used.

The conventional GPC calibration is done with 20 narrow polystyrene (PS) standards (Polymer Laboratories Ltd.) with molecular weights in the range 580-7,500,000 g/mol. The polystyrene standard peak molecular weights are converted to polyethylene molecular weights using the following equation: $M_{polyethylene}=A*(M_{polystyrene})^B$, with A=0.39, and B=1. The value of A is determined by using a linear high density polyethylene homopolymer (HDPE) with Mw of 115,000 g/mol. This HDPE reference material is also used to calibrate the IR detector and viscometer by assuming 100% mass recovery and an intrinsic viscosity of 1.873 dL/g.

Distilled "Baker Analyzed" grade TCB (J. T. Baker, Deventer, The Netherlands), containing 200 ppm of 2,6-di-tert-butyl-4-methylphenol (Merck, Hohenbrunn, Germany), is used as the solvent for sample preparation, as well as for the 3Det-GPC experiment. HDPE SRM 1483 is obtained from the U.S. National Institute of Standards and Technology (Gaithersburg, Md., USA).

LDPE solutions are prepared by dissolving the samples, under gentle stirring, for three hours at 160° C. The PS standards are dissolved under the same conditions for 30 minutes. The sample concentration is 1.5 mg/mL, and the polystyrene concentrations are 0.2 mg/mL.

A MALS detector measures the scattered signal from polymers or particles in a sample under different scattering angles θ. The basic light scattering equation (from M. Anderson, B. Wittgren, K.-G. Wahlund, Anal. Chem. 75, 4279 (2003)) can be written as follows:

$$\sqrt{\frac{Kc}{R_\theta}} = \sqrt{\frac{1}{M} + \frac{16\pi^2}{3\lambda^2}\frac{1}{M}Rg^2\sin^2\left(\frac{\theta}{2}\right)},$$

where Rθ is the excess Rayleigh ratio, K is an optical constant, which is, among other things, dependent on the specific refractive index increment (dn/dc), c is the concentration of the solute, M is the molecular weight, Rg is the radius of gyration, and λ is the wavelength of the incident light. Calculation of the molecular weight and radius of gyration from the light scattering data require extrapolation to zero angle (see also P. J. Wyatt, Anal. Chim. Acta 272, 1 (1993)). This is done by plotting $(Kc/R0)^{1/2}$ as a function of sin 2(θ/2) in the so-called Debye plot. The molecular weight can be calculated from the intercept with the ordinate, and the radius of gyration from initial slope of the curve. The second virial coefficient is assumed to be negligible. The intrinsic viscosity numbers are calculated from both the viscosity and concentration detector signals by taking the ratio of the specific viscosity and the concentration at each elution slice.

ASTRA 4.72 (Wyatt Technology Corp.) software is used to collect the signals from the IR detector, the viscometer, and the MALS detector, and to run the calculations.

The calculated molecular weights, e.g. the absolute weight average molecular weight Mw(abs), and absolute molecular weight distributions (e.g., Mw(abs)/Mn(abs)) are obtained using a light scattering constant derived from one or more of the polyethylene standards mentioned and a refractive index concentration coefficient, do/dc, of 0.104. Generally, the mass detector response and the light scattering constant should be determined from a linear standard with a molecular weight in excess of about 50,000 Daltons. The viscometer calibration can be accomplished using the methods described by the manufacturer, or alternatively, by using the published values of suitable linear standards such as Standard Reference Materials (SRM) 1475a, 1482a, 1483, or 1484a. The chromatographic concentrations are assumed low enough to eliminate addressing 2nd virial coefficient effects (concentration effects on molecular weight).

The obtained MWD(abs) curve from TD-GPC is summarized with three characteristic parameters: the absolute weight average molecular weight Mw(abs), the absolute number average molecular weight Mn(abs), and w, where w is defined as "weight fraction of molecular weight greater than $5\times10^6$ g/mole, based on the total weight of polymer, and as determined by GPC(abs)."

In equation form, the parameters are determined as follows. Numerical integration from the table of "log M" and "dw/d log M" is typically done with the trapezoidal rule:

$$Mw(\text{abs}) = \int_{-\infty}^{\infty} M \frac{dw}{d\log M} d\log M,$$

$$Mn(\text{abs}) = \frac{1}{\int_{-\infty}^{\infty} \frac{1}{M} \frac{dw}{d\log M} d\log M}, \text{ and}$$

$$w = \int_{\log(5 \times 10^{\wedge}6)}^{\infty} \frac{dw}{d\log M} d\log M.$$

Rheological G'

The sample used in the G' measurement is prepared from a compression molding plaque. A piece of aluminum foil is placed on a back plate, and a template or mold is placed on top of the back plate. Approximately 12 grams of resin is placed in the mold, and a second piece of aluminum foil is placed over the resin and mold. A second back plate is then placed on top of the aluminum foil. The total ensemble is put into a compression molding press, which is run at the following conditions: 3 min at 150° C., at 10 bar pressure, followed by 1 min at 150° C., at 150 bar, followed by a "1.5 min" quench cooling to room temperature, at 150 bar. A 25 mm disk is stamped out of the compression-molded plaque. The thickness of this disk is approximately 2.0 mm.

The rheology measurement to determine G' is done in a nitrogen environment, at 170° C., and a strain of 10%. The stamped-out disk is placed between the two "25 mm" parallel plates located in an ARES-1 (Rheometrics SC) rheometer oven, which is preheated, for at least 30 minutes, at 170° C., and the gap of the "25 mm" parallel plates is slowly reduced to 1.65 mm. The sample is then allowed to remain for exactly 5 minutes at these conditions. The oven is then opened, the excess sample is carefully trimmed around the edge of the plates, and the oven is closed. The storage modulus and loss modulus of the sample are measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade are used.

The data are plotted (G' (Y-axis) versus G" (X-axis)) on a log-log scale. The Y-axis scale covers the range from 10 to 1000 Pa, while the X-axis scale covers the range from 100 to 1000 Pa. The Orchestrator software is used to select the data in the region where G" is between 200 and 800 Pa (or using at least 4 data points). The data are fit to a log polynomial model using the fit equation Y=C1+C2 ln(x). Using the Orchestrator software, G' at G" equal to 500 Pa is determined by interpolation.

Standard Method for Hexane Extractable

Polymer pellets (from the polymerization, pelletization process without further modification approximately 2.2 grams of pellets pressed into a film) are pressed in a Carver Press, at a thickness of 3.0-4.0 mils. The pellets are pressed at 190° C., for three minutes, at 3,000 lbf, and then at 190° C., for three minutes, at 40,000 lbf. Non-residue gloves (PIP*CleanTeam* Cotton Lisle Inspection Gloves, Part Number: 97-501) are worn, so as to not contaminate films with residual oils from the hands of the operator. Films are cut into "1 inch×1 inch" squares, and weighed. Enough film samples are used, such that 2.5 g of film samples are used for each extraction. The films are then extracted for two hours, in a hexane vessel containing about 1000 ml of hexane, at "49.5±0.5° C." in a heated water bath.

The hexane used is an isomeric hexanes mixture (for example, Hexanes (Optima), Fisher Chemical, High purity mobile phase for HPLC and/or extraction solvent for GC applications, 99.9% min by GC). After two hours, the films are removed, rinsed in clean hexane, initially dried with nitrogen and then further dried in a vacuum oven (80±5° C.) at full vacuum (ISOTEMP Vacuum Oven, Model 281A at approximately 30 inches Hg) for two hours. The films are then placed in a desiccator, and allowed to cool to room temperature for a minimum of one hour. The films are then re-weighed, and the amount of mass loss due to extraction in hexane is calculated.

EXPERIMENTAL

Comparative Example (A, B and C)

Reaction Scheme

Figure 1:
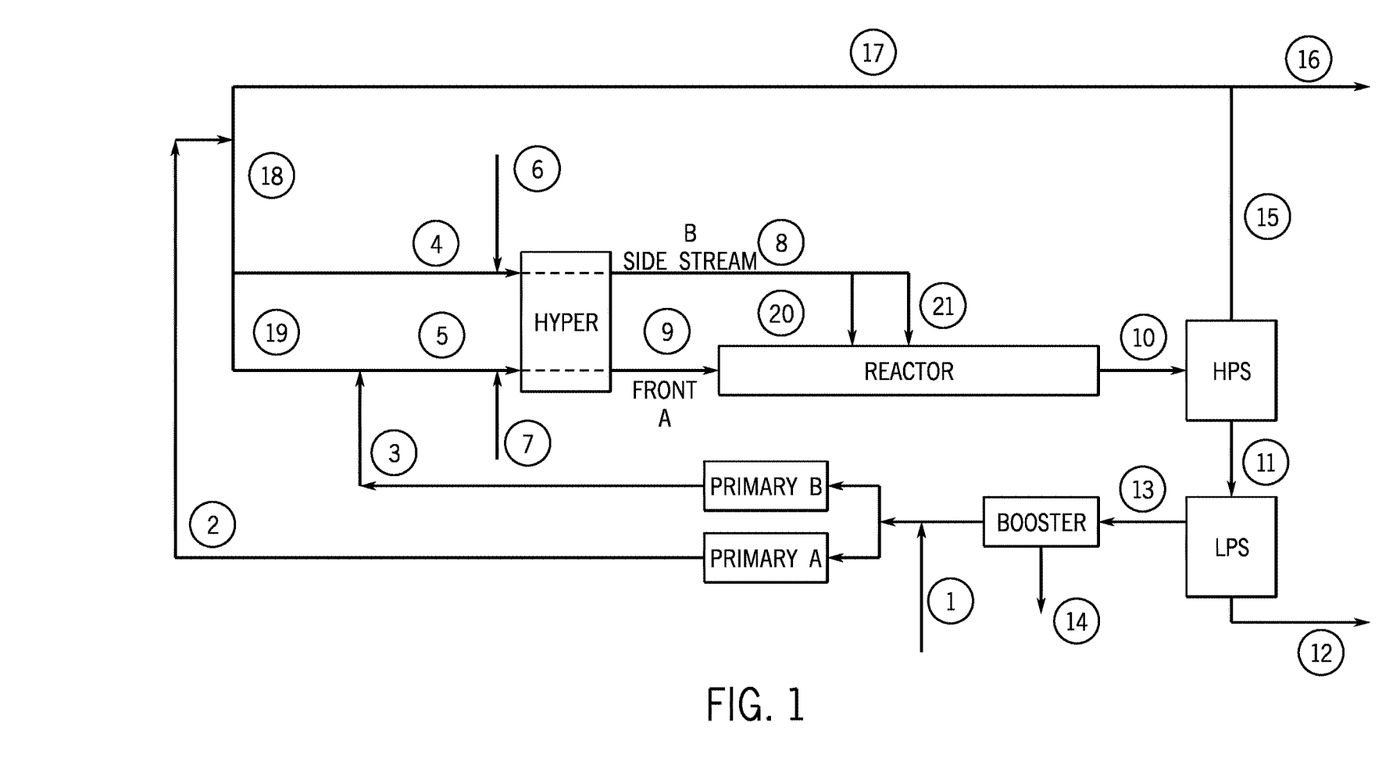
FIG. 1 depicts a polymerization flow scheme containing a tubular reactor.

Comparative examples A, B, C were manufactured using the flow scheme of a high pressure polymerization plant depicted in FIG. 1. Stream (1) is the fresh ethylene make-up, which is compressed together with the outlet of the booster compressor (Booster) by the two primary compressors (Primary A and Primary B) to respectively stream (2) and stream 3. Stream (2) is combined with high pressure recycle stream (18) and distributed over stream (4) and stream (19). Stream (4) is fed to the suction side of the secondary compressor (Hyper), which feeds compressed ethylene to the side feed stream (8). Stream 3 is combined with stream (19) and fed to the suction side of the secondary compressor (Hyper), which feeds compressed ethylene through stream 9 (Front) to the front of the reactor. Stream (8) is distributed over the side feed streams (20) and (21), which are lined up to respectively the inlet of $2^{nd}$ and $3^{rd}$ reaction zones.

Stream (6) and (7) depict the make-up feeds of the chain transfer agent (CTA) system. The secondary compressor (Hyper) pressurizes the ethylene feed streams, containing a chain transfer agent system, to a level sufficient to feed the high pressure tubular reactor (Reactor).

The tubular reactor (Reactor) is equipped with three reaction zones. Stream 9 is preheated to a sufficient high start temperature before polymerization is initiated in the $1^{st}$ reaction zone. In the reactor, the polymerization is initiated with the help of free radical initiation systems injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The high pressure separator separates the reaction mixture into an ethylene rich stream (15), containing unconverted CTA and minor amounts of waxes and/or entrained polymer, and a polymer rich stream (11), which is sent for further separation to the low pressure separator (LPS). Ethylene stream (15) is cooled down and cleaned in stream (17). Stream (16) is a purge stream to remove impurities and/or inerts.

The polymer separated in LPS is further processed in (12). The ethylene removed in the LPS is fed via line (13) to the booster compressor (Booster), where during the compression condensables, like solvent, lubrication oil and other components, are collected and removed through stream (14).

The outlet of the booster compressor is combined with the make-up ethylene stream (1), and further compressed by the primary compressors.

Reaction Protocol

The polymerization was carried out in the tubular reactor with three reaction zones. In each reaction zone, pressurized water was used for cooling and/or heating the reaction medium, by circulating this water through the jacket of the reactor. The inlet-pressure was 2100 bar, and the pressure drop over the whole tubular reactor system was about 300 bars Each reaction zone had one inlet and one outlet. Each inlet stream consisted of the outlet stream from the previous reaction zone and/or an added ethylene-rich feed stream. The ethylene was supplied according to a specification, which allowed a trace amount (maximum of 5 mol ppm) of acetylene in the ethylene. Thus, the maximum, potential amount of incorporated acetylene in the polymer is less than, or equal to, 16 mole ppm, based on the total moles of monomeric units in the ethylene-based polymer (see conversion level in Table 3). The non-converted ethylene, and other gaseous components in the reactor outlet, were recycled through the high pressure and a low pressure recycles, and were compressed and distributed through the booster, the primary and a hyper (secondary) compressors, according to the flow scheme shown in FIG. 1 (reference numbers in the following paragraphs refer to the various elements of FIG. 1). Organic peroxides (see Table 1) were fed into each reaction zone.

Acetone was used as a chain transfer agent, and it was present in each reaction zone inlet originated from the low pressure and high pressure recycle flows (#13 and #15), as well as from freshly injected CTA make-up stream #7 and/or stream #6. In this comparative example, the weight ratio between the "CTA make up" streams #7 and #6 was respectively 3.6 (for A), 3.6 (for B) and 3.3 (for C).

After reaching the first peak temperature (maximum temperature) in reaction zone 1, the reaction medium was cooled with the aid of the pressurized water. At the outlet of reaction zone 1, the reaction medium was further cooled by injecting a fresh, cold, ethylene-rich feed stream (#20), and the reaction was re-initiated by feeding an organic peroxide. This process was repeated at the end of the second reaction zone, to enable further polymerization in the third reaction zone. The polymer was extruded and pelletized (about 30 pellets per gram), using a single screw extruder design at a melt temperature of 230-250° C. The weight ratio of the ethylene-rich feed streams to the three reaction zones was 1.00:0.75:0.25. The R2 and R3 values were each 2.16 in all examples. The R values are calculated according to U.S. Provisional Application No. 61/548,996 (International Application No. PCT/US12/059469). The internal process velocity was approximately 12.5, 9 and 11 msec for respectively the 1st, 2nd and 3rd reaction zone. Additional information can be found in Tables 2 and 3.

TABLE 1

Initiators of the Comparative Examples

| Initiator | Abbreviation |
|---|---|
| tert-Butyl peroxy-2-ethyl hexanoate | TBPO |
| Di-tert-butyl peroxide | DTBP |
| 3,6,9-triethyl 3,6,9-trimethyl 1,4,7-peroxonane | TETMP |

TABLE 2

Pressure and Temperature Conditions of the Comparative Examples

| | Type | Inlet-pressure/ bar | Start-temp./ ° C. | Reinitiation temp. 2nd zone/° C. | Reinitiation temp. 3rd zone/ ° C. | 1st Peak temp./° C. | 2nd Peak temp./° C. | 3rd Peak temp./° C. |
|---|---|---|---|---|---|---|---|---|
| A | Inv. | 2100 | 140 | 155 | 242 | 335 | 331 | 312 |
| B | Inv. | 2100 | 140 | 159 | 246 | 330 | 330 | 312 |
| C | Inv. | 2100 | 140 | 159 | 241 | 331 | 326 | 311 |

TABLE 3

Additional Information of the Comparative Examples

| | Peroxides | CTA | I2 dg/min | R2 and R3 Value | Conversion % |
|---|---|---|---|---|---|
| A | TBPO/DTBP/TETMP | Acetone | 6.5 | 2.16 | 33.7 |
| B | TBPO/DTBP/TETMP | Acetone | 3.3 | 2.16 | 33.6 |
| C | TBPO/DTBP/TETMP | Acetone | 2.0 | 2.16 | 33.4 |

Inventive Examples (IE 1, 2, 3)

The polymerization was carried out in tubular reactor with four reaction zones. In each reaction zone, pressurized water was used for cooling and/or heating the reaction medium, by circulating this water countercurrent through the jacket of the reactor. The inlet-pressure was 2150 bar. The ethylene throughput was about 45 t/h. Each reaction zone had one inlet and one outlet. Each inlet stream consisted of the outlet stream from the previous reaction zone and/or an added ethylene-rich feed stream. The ethylene was supplied according to a specification, which allowed a trace amount (maximum of 5 mol ppm) of acetylene in the ethylene. Thus, the maximum, potential amount of incorporated acetylene in the polymer is less than, or equal to, 16 mole ppm, based on the total moles of monomeric units in the ethylene-based polymer. The non-converted ethylene, and other gaseous components in the reactor outlet, were recycled through a high pressure and a low pressure recycles, and were compressed through a booster, a primary and a hyper (secondary) compressor. Organic peroxides (see Table 4) were fed into each reaction zone. For each polymerization, both propionaldehyde (PA) and n-butane were used as a chain transfer agent, and were present in each reaction zone. The ethylene rich reactor feed streams contain even concentrations of the applied chain transfer agents.

After reaching the first peak temperature (maximum temperature) in reaction zone 1, the reaction medium was cooled with the aid of the pressurized water. At the outlet of reaction zone 1, the reaction medium was further cooled by injecting a fresh, cold, ethylene-rich feed stream, containing organic peroxide for re-initiation. At the end of the second reaction zone, to enable further polymerization in the third reaction zone, organic peroxides were fed. This process was repeated at the end of the third reaction zone to enable further polymerization in the fourth reaction zone The polymer was extruded and pelletized (about 30 pellets per gram), using a single screw extruder design at a melt temperature around 230-250° C. The weight ratio of the ethylene-rich feed streams to the four reaction zones was X:(1.00-X):0.00:0.00, where X is the weight fraction of the overall ethylene rich feedstream, X is specified in Table 6 as "Ethylene to the front/wt %". The internal process velocity was approximately 15, 13, 12 and 12 msec for respectively the 1st, 2nd, 3rd and 4th reaction zone. Additional information can be found in Tables 5 and 6.

TABLE 4

Initiators for the Inventive Examples

| Initiator | Abbreviation |
|---|---|
| tert-Butyl peroxy-2-ethyl hexanoate | TBPO |
| Di-tert-butyl peroxide | DTBP |

TABLE 5

Pressure and Temperature Conditions for the Inventive Examples

| | Type | Inlet-pressure/ bar | Start-temp./ °C. | Reinitiation temp. 2nd zone/ °C. | Reinitiation temp. 3rd zone/ °C. | Reinitiation temp. 4rd zone/ °C. | 1st Peak temp/ °C. | 2nd Peak temp/ °C. | 3rd Peak temp./ °C. | 4th Peak temp./ °C. |
|---|---|---|---|---|---|---|---|---|---|---|
| 1 | Inv. | 2150 | 151 | 180 | 251 | 247 | 319 | 313 | 311 | 301 |
| 2 | Inv. | 2150 | 150 | 184 | 248 | 253 | 319 | 314 | 316 | 301 |
| 3 | Inv. | 2150 | 152 | 183 | 248 | 253 | 319 | 314 | 314 | 301 |

TABLE 6

Additional Information of the Inventive Examples

| | Peroxides | CTA | Make-up flow ratio by weight PA/n-butane | $I_2$ dg/min | Ethylene to the front/wt % |
|---|---|---|---|---|---|
| 1 | TBPO/DTBP | PA/n-butane | 2.1 | 4.2 | 46 |
| 2 | TBPO/DTBP | PA/n-butane | 1.4 | 5.9 | 47 |
| 3 | TBPO/DTBP | PA/n-butane | 1.0 | 8.3 | 47 |

Polymer properties are shown in Tables 7 and 8.

TABLE 7

Inventive and Comparative Polymers

| LDPE | Type** | $I_2$ (dg/min) | Density (g/cc) | Mw(abs) (kg/mol) | Mw(abs)/Mn (abs) | G' (Pa) at G" = 500 Pa | Hexane Extr. (wt %) | w (wt %) |
|---|---|---|---|---|---|---|---|---|
| PG7004*[f] | CE, AC | 4.1 | 0.9215 | 321 | 22.6 | 146 | — | 0.90 |
| PT7009*[f] | CE, AC | 8.7 | 0.9188 | 346 | 23.5 | 120 | 1.8 | 0.98 |
| LDPE 160C*** | CE, tub | 6.4 | 0.9175 | 289 | 25.9 | 110 | 4.8 | 0.84 |
| SABIC nExCoat 5* | CE, tub X-Link | 4.6 | 0.9170 | 217 | — | 149 | 3.3 | 0.09 |
| A | CE, tub | 6.5 | 0.9184 | 162 | 13.6 | 125 | 4.0 | 0.10 |
| B | CE, tub | 3.3 | 0.9191 | 188 | 14.4 | 142 | 3.6 | 0.13 |
| C | CE, tub | 2.0 | 0.9193 | 196 | 14.3 | 153 | 3.0 | 0.09 |
| 1 | IE, tub | 3.9 | 0.9177 | 260 | 22.4 | 140 | 3.0 | 0.64 |
| 2 | IE, tub | 5.8 | 0.9174 | 245 | 20.4 | 133 | 3.3 | 0.53 |
| 3 | IE, tub | 8.0 | 0.9179 | 221 | 19.2 | 126 | 3.4 | 0.46 |

*Commercial Polymers
**CE: Comparative Example; IE: Inventive Example; AC: Autoclave-based; tub X-Link: Tubular Crosslinked; tub: Tubular.
***Former Dow LDPE 160C
[f]Available from The Dow Chemical Company.

TABLE 8

Polymer Properties in Claims

| LDPE | $I_2$ (dg/min) | w (wt %) | G' (Pa) | Hexane Extr. (wt %) | Mw(abs) (kg/mol) | $A - B * (I_2)^a$ (wt %) | $C - B * (I_2)^b$ (wt %) | $D - E * \log(I_2)^c$ (Pa) | $X + Y * \log(I_2)^d$ |
|---|---|---|---|---|---|---|---|---|---|
| PG7004 | 4.1 | 0.90 | 146 | — | 321 | 0.32 | 0.82 | 130 | 3.3 |
| PT7009 | 8.7 | 0.98 | 120 | 1.8 | 346 | 0.23 | 0.73 | 113 | 3.9 |

TABLE 8-continued

Polymer Properties in Claims

| LDPE | $I_2$ (dg/min) | w (wt %) | G' (Pa) | Hexane Extr. (wt %) | Mw(abs) (kg/mol) | A − B * $(I_2)^a$ (wt %) | C − B * $(I_2)^b$ (wt %) | D − E * $\log(I_2)^c$ (Pa) | X + Y * $\log(I_2)^d$ |
|---|---|---|---|---|---|---|---|---|---|
| LDPE 160C | 6.4 | 0.84 | 110 | 4.8 | 289 | 0.27 | 0.77 | 120 | 3.6 |
| SABIC nExCoat 5 | 4.6 | 0.09 | 149 | 3.3 | 217 | 0.31 | 0.81 | 128 | 3.4 |
| A | 6.5 | 0.10 | 125 | 4.0 | 162 | 0.27 | 0.77 | 120 | 3.6 |
| B | 3.3 | 0.13 | 142 | 3.6 | 188 | 0.33 | 0.83 | 135 | 3.2 |
| C | 2.0 | 0.09 | 153 | 3.0 | 196 | 0.36 | 0.86 | 146 | 2.8 |
| 1 | 3.9 | 0.64 | 140 | 3.0 | 260 | 0.32 | 0.82 | 131 | 3.3 |
| 2 | 5.8 | 0.53 | 133 | 3.3 | 245 | 0.28 | 0.78 | 122 | 3.6 |
| 3 | 8.0 | 0.46 | 126 | 3.4 | 221 | 0.24 | 0.74 | 115 | 3.8 |

$^a$w > A − B * $I_2$, where A = 0.4 wt % and B is 0.02 wt %/(dg/min);
$^b$w < C − B * $I_2$, where A = 0.9 wt % and B is 0.02 wt %/(dg/min);
$^c$G' > D − E * $\log(I_2)$, where D = 162 Pa and E = 52 Pa/log(dg/min);
$^d$a hexane extractable ≤ X + Y * $\log(I_2)$, where X = 2.3 wt % and Y = 1.66 wt %/log(dg/min)

The inventive examples have an excellent balance of polymer properties. Medium level of the ultra-high molecular weight tail related to the pre-peak, expressed in w (being the weight fraction of molecules with molar mass larger than $5 \times 10^6$ g/mol); advantaged low extractables, and high elasticity G'.

Comparative examples, PG7004 and PT7009, are autoclave LDPE. These examples have low extractables, but have significantly higher ultra-high molecular weight fraction for the same G' level, as compared to the inventive samples.

Comparative example LDPE 160C is a tubular resin that has moderate to high G' values, is accompanied with high extractables, and has a significantly higher ultra-high molecular weight fraction as compared to the inventive samples. This sample is an example of a class of polymers that acquire their G' from non-tailored broadening, which can give high w, but at the same time, a lot of low molar mass species (high Mw(abs)/Mn(abs) that negatively affect extractables (i.e. lead to more extractables)). Their G' is also not as high as achieved in the inventive polymers here.

Comparative example SABIC NEXCOATS (modified with a cross linking agent) is a tubular resin that does have a high G' value, but lacks the pre-peak, and thus has low w. Comparative examples A through C are tubular resins with high G', but without the pre-peak, and thus having low w. They also have higher extractables at a given $I_2$ than the inventive samples.

Figure 2:
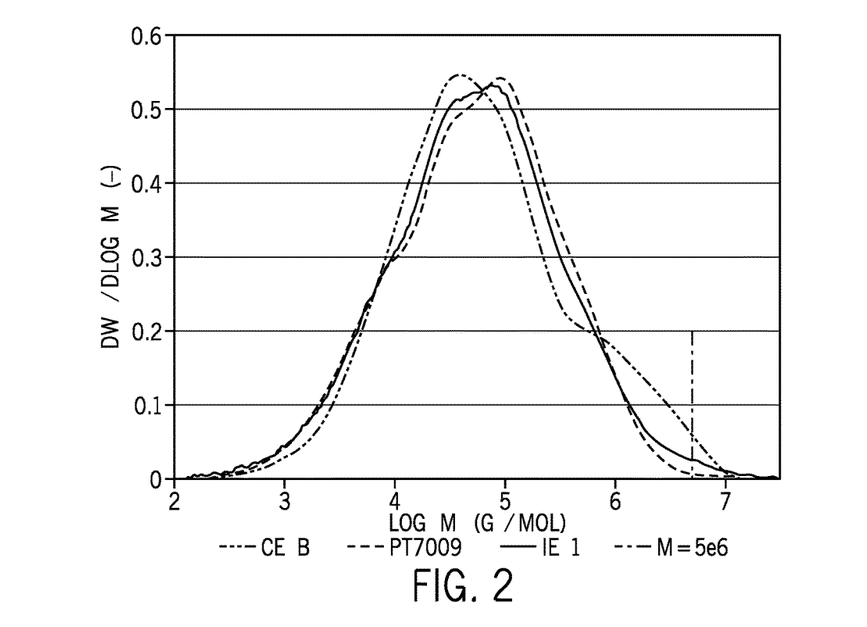
FIG. 2 depicts GPC (LS) profiles for inventive and comparative polymers.

FIG. 2 shows the MWD of three selected resins, PT7009, CE B, and IE 1. It is clear that IE 1 has a different high molecular weight tail than both these comparative products.

Figure 3:
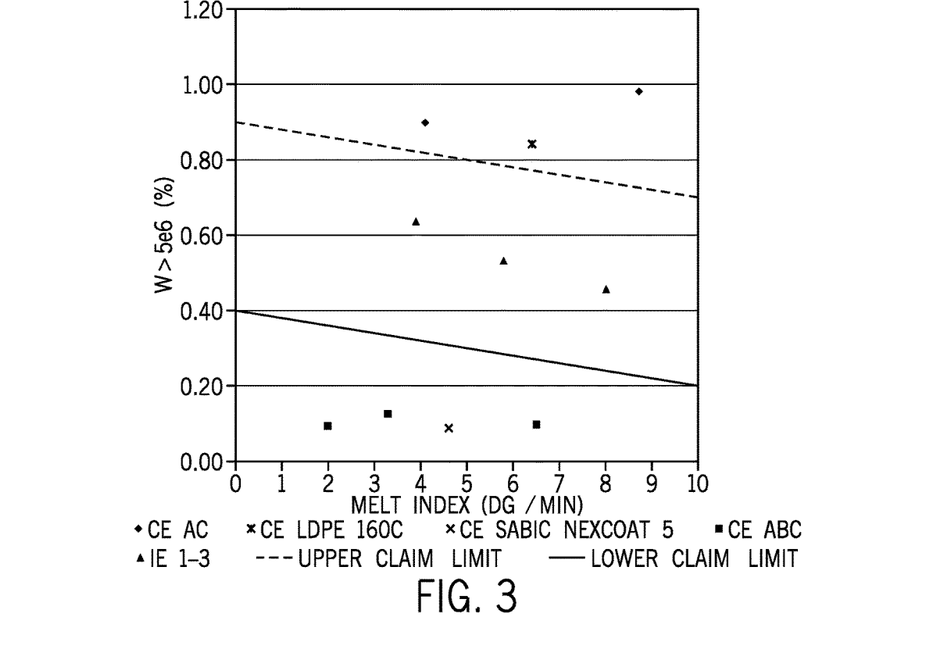
FIG. 3 depicts the weight fraction (w) of molecular weight above $5*10^6$ g/mol versus melt index ($I_2$) for inventive and comparative polymers.
Figure 4:
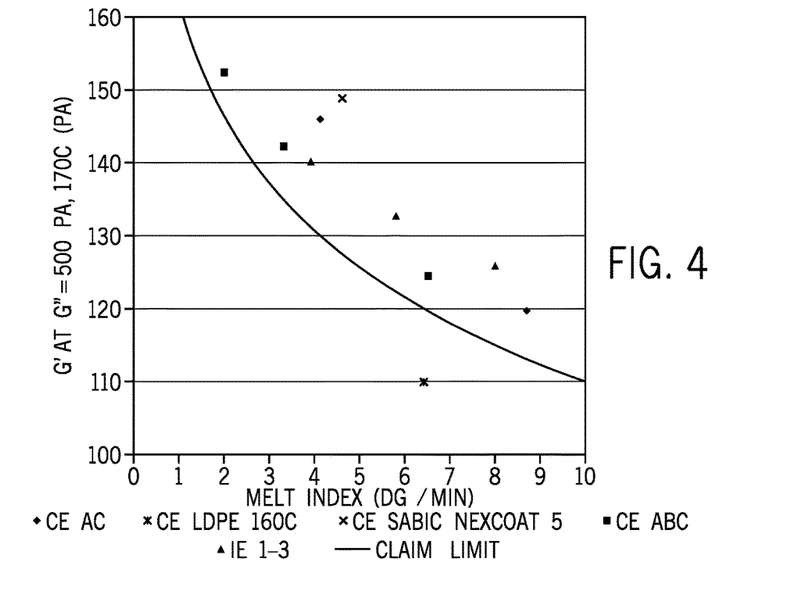
FIG. 4 depicts the G' (at G"=500 Pa, 170° C.) versus melt index ($I_2$) for inventive and comparative polymers.
Figure 5:
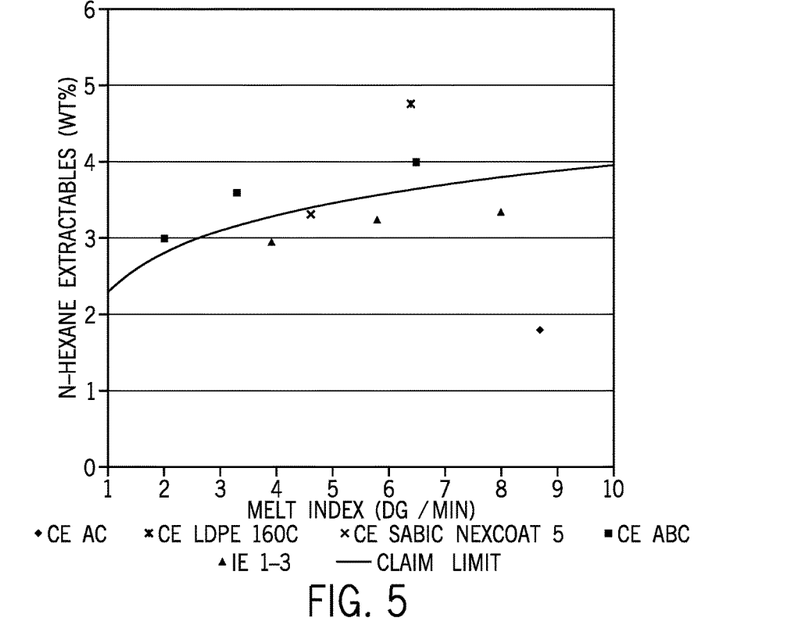
FIG. 5 depicts the n-hexane extractables versus melt index ($I_2$) for inventive and comparative polymers.

All properties are considered in relation to melt index, which is shown in FIGS. 2-4. The inventive polymers have intermediate w (FIG. 3), high G' (FIG. 4), and low extractables (FIG. 5) for their MI and Mw and Mw/Mn.

The high G' of the inventive polymers is good for extrusion coating and other strong flow applications, such as blown and cast film and foaming. Broad MWD is required for extrusion coating and related applications. Typically tubular products are narrower in MWD than autoclave products. The MWD of tubular LDPE can be broadened via application of coupling and/or branching agents, and/or by optimized process conditions, like peak temperature, pressure (leading to enhanced LCB levels), and specific application of CTA. Within the process-condition option, the present inventive examples are a special case where the MWD broadening is further enhanced by inducing or by the presence of segmented flow, which leads to introduction of an ultra-high molecular weight fraction in the polymer. This type of broadening is expected to be especially good for lower strain rate extensional flow, when compared to samples that lack this fraction. The low extractables of the inventive polymers are good for high-quality processing, for example, lowering smoke formation in extrusion operations, and relevant for food contact applications.

Although the invention has been described in considerable detail in the preceding examples, this detail is for the purpose of illustration, and is not to be construed as a limitation on the invention as described in the following claims.

The invention claimed is:

1. An ethylene-based polymer comprising the following properties:
   a) weight fraction, as a percentage (w) of molecular weight above $5*10^6$ g/mol, w>A−B*I2, where A=0.4 wt %, and B is 0.02 wt %/(dg/min), and w<C−B*$I_2$%, where C=0.9 wt %;
   b) G' (at G" equal to 500 Pa, 170° C.)>D−E*log(I2), where D=162 Pa and E=52 Pa/log(dg/min),
   c) an Mw(abs) versus melt index ($I_2$) relationship: Mw(abs)≤A+B*log($I_2$), where A=3.50*$10^5$ grams per mole (g/mole), and B=−1.20*$10^5$ (g/mole)/log(dg/min); and
   d) n-hexane extractables <X wt % +Y*log($I_2$), where X=2.3 wt % and Y=1.66 wt %/log(dg/min).

2. The ethylene-based polymer of claim 1, wherein the polymer has a melt index ($I_2$) from 0.3 to 16 dg/min.

3. The ethylene-based polymer of claim 1, wherein the polymer has a melt index ($I_2$) from 0.4 to 16 dg/min.

4. The ethylene-based polymer of claim 1, wherein the polymer has a melt index ($I_2$) from 0.5 to 16 dg/min.

5. The polymer of claim 1, in which the ethylene-based polymer has a melt index ($I_2$)≥0.8 to ≤10 dg/min.

6. The polymer of claim 1, in which the ethylene-based polymer has a density from 0.916 to 0.925 g/cc.

7. The polymer of claim 1, in which the polymer has a n-hexane extractables level than or equal to 3.0 wt %.

8. The polymer of claim 1, in which the n-hexane extractables are <X wt %+Y*log($I_2$), where X=2.3 wt % and Y=1.66 wt %/log(dg/min) when the $I_2$ is 0.5 dg/min <I2<12 dg/min.

9. The polymer of claim 1, in which the ethylene-based polymer has a weight fraction, as a percentage (w) of molecular weight above $5*10^6$ g/mol, greater than 0.4 wt % and smaller than 0.7 wt %.

10. The polymer of claim 1, in which the ethylene-based polymer comprises less than 30 mole parts per million (ppm) of a crosslinking agent or a comonomer with crosslinking capability, based on total moles of monomer units in the ethylene-base polymer.

11. The polymer of claim 1, in which the ethylene-based polymer comprises less than 30 ppm of a comonomer containing multiple unsaturations or containing an acetylenic functionality.

12. The polymer of claim 1, in which the ethylene-based polymer is prepared in a reactor configuration comprising at least one tubular reactor.

13. The polymer of claim 12, in which the tubular reactor comprises at least three reaction zones.

14. The polymer of claim 12, in which the tubular reactor comprises at least four reaction zones.

15. The polymer of claim 1, in which the ethylene-based polymer is a polyethylene homopolymer.

16. The polymer of claim 15, in which the ethylene-based polymer is LDPE.

17. A composition comprising the ethylene-based polymer of claim 1.

18. A composition comprising the ethylene-based polymer of claim 16.

19. An article comprising at least one component formed from the composition of claim 17.

20. An article comprising at least one component formed from the composition of claim 18.

* * * * *